April 3, 1951 A. M. SKELLETT 2,547,416
DIELECTRIC LENS
Filed Dec. 19, 1946 5 Sheets-Sheet 2

INVENTOR
A.M. SKELLETT
BY
Harry C. Hart
ATTORNEY

April 3, 1951 — A. M. SKELLETT — 2,547,416
DIELECTRIC LENS
Filed Dec. 19, 1946 — 5 Sheets—Sheet 3
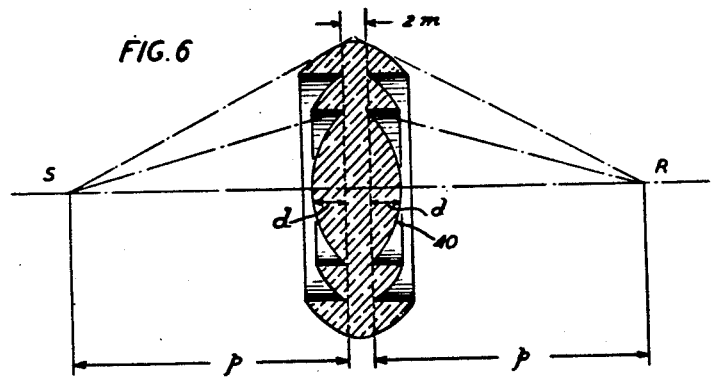
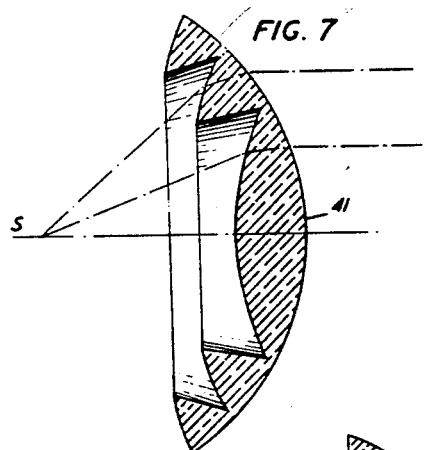
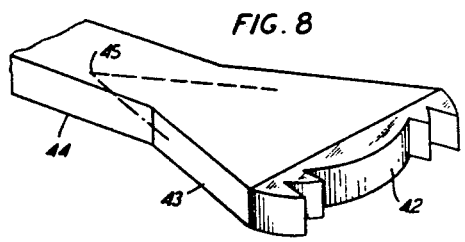
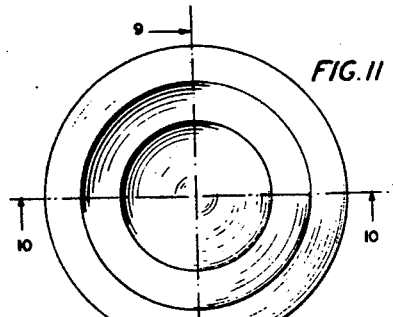
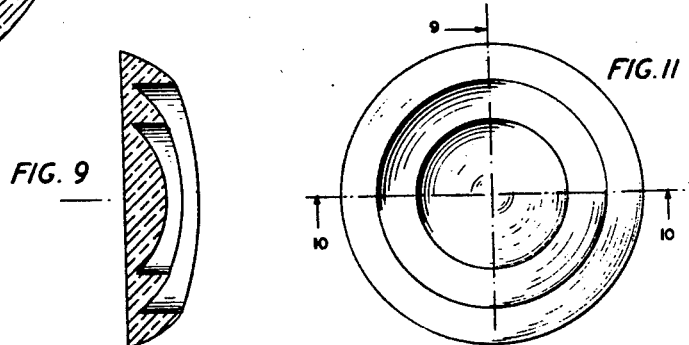
INVENTOR
A. M. SKELLETT
BY Harry P. Hart
ATTORNEY April 3, 1951  A. M. SKELLETT  2,547,416
DIELECTRIC LENS
Filed Dec. 19, 1946  5 Sheets-Sheet 4
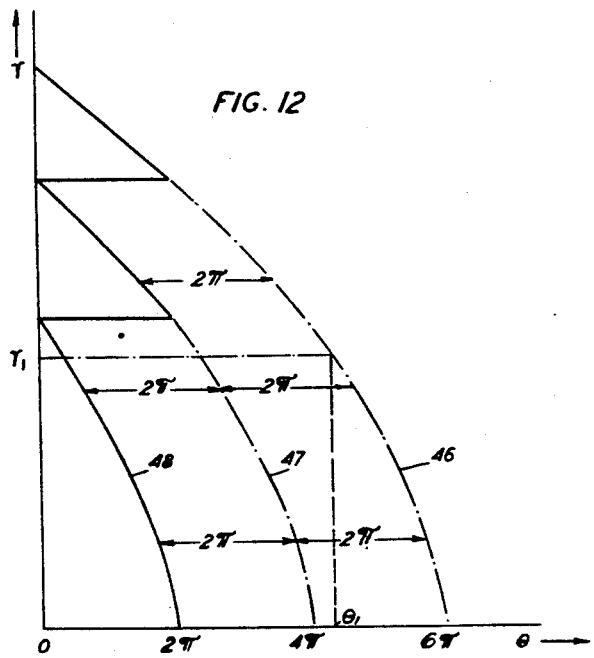
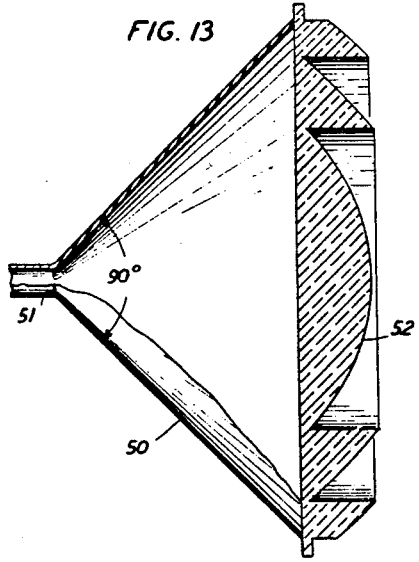
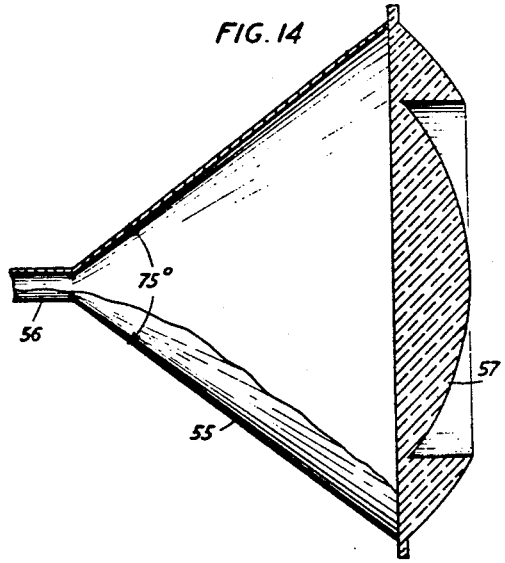
INVENTOR
A. M. SKELLETT
BY
Harry C. Hart
ATTORNEY April 3, 1951  A. M. SKELLETT  2,547,416
DIELECTRIC LENS
Filed Dec. 19, 1946  5 Sheets-Sheet 5 graded dielectric constant

INVENTOR
A.M. SKELLETT
BY
Harry C. Hart
ATTORNEY

Patented Apr. 3, 1951

2,547,416

UNITED STATES PATENT OFFICE 2,547,416

DIELECTRIC LENS

Albert M. Skellett, Madison, N. J., assignor to Bell Telephone Laboratories, Incorporated, New York, N. Y., a corporation of New York Application December 19, 1946, Serial No. 717,214

10 Claims. (Cl. 250—33.63)

This invention relates to the refraction of microwaves, and particularly to novel dielectric lenses for microwave refraction and to the design, construction and uses thereof.

The principal object of the invention is to provide a sharp, narrow beam of substantially plane wave radiation at microwave frequencies. A related object is to convert the approximately spherical wave radiation of a microwave source such as a dipole, an electromagnetic horn, or the like into substantially plane wave radiation and to concentrate it into a narrow beam. Another related object is to receive incident microwave radiation and convert it into convergent substantially spherical waves for concentration onto an antenna of small dimensions.

It has long been known that microwaves could for some purposes be treated by optical techniques developed originally for use at visual wavelengths. Out of this knowledge has grown the term "quasi-optical," employed to designate radiations in the wavelength band extending from a few millimeters to a few centimeters. Spherical lenses of dielectric material, parabolic and paraboloidal reflectors, diffraction zone plates, and the like, have been employed to direct the radiation of transmitting antennae toward receiving antennae, and with varying degrees of success. Hayes Patent 1,923,976, Ohl Patents 2,240,941 and 2,283,568, Dallenbach Patent 2,054,895, Clavier Patent 2,043,347, Bruce Patent 2,169,553, and Southworth Patent 2,206,923 are representative of these suggestions.

Some have sought to improve the plane wave front character of transmitted radiation by combining in a single device the features of two or more different kinds of optical elements. Thus Darbord, in Patent 1,906,546, has undertaken to fuse the parabolic reflector with the diffraction zone plate, while King, in Patent 2,283,935, seeks to embody lens principles in a diffraction zone plate.

It is characteristic of many of these prior art structures and suggestions that while the similarities between the microwave field and the visual wavelength field are heavily stressed, their differences, which are consequent upon the wide discrepancy between their wavelengths, are minimized or overlooked. In accordance with the invention, to the contrary, these very differences are turned to positive account, and a new avenue of approach is opened to the designer. Thus the conventional concepts of a spherical lens surface and a "focal length" dependent on the radii of curvature of two surfaces are discarded. Instead there are adopted the concepts of equiphase wave fronts, plane or otherwise, and the lens contour is obtained by equalization of the phase delay from a given wave front, with which the designer is confronted, to another wave front of desired configuration which is to be obtained. In what is perhaps the simplest case, the first wave front is the substantially spherical one which is normally radiated by an unconfined antenna radiator of small dimensions when all parts of it oscillate in like phase, and the second wave front is a substantially plane emergent wave. By selecting the thickness of the lens at all points so that the phase delay in the lens balances the phase delay elsewhere, e. g., in the surrounding medium, the emergent radiation wave front may be concentrated into an equiphase plane.

The lens which results from this process is capable of exactly meeting the requirements imposed on it. It is aplanatic, i. e., wholly free from spherical aberration. Its surface, moreover, is generally not spherical. In addition, if the medium of which the lens is constructed is not dispersive; i. e., if its dielectric constant is independent of the frequency (or wavelength) of the radiation, such a lens operates equally well at various wavelengths. In other words it is achromatic as well as aplanatic.

Because two phase conditions which differ by 360 degrees or any multiple thereof are mutually indistinguishable, it is possible in accordance with the invention to introduce phase discontinuities of 360 degrees, or any integral multiple thereof into the emergent wave front without adversely affecting the results. In a preferred embodiment for use with radiation of a single wavelength, the lens is provided with steps of proper depth, and properly located, to produce this result, i. e., integral wavelength phase delay steps. Thus each zone of the lens corresponds to two adjacent zones of a conventional diffraction zone plate. This arrangement results in economy of weight and of the lens material. However, because the locations and depths of the steps are related to the wavelength, such a lens operates perfectly at only one wavelength, and is therefore subject to chromatic aberration.

The lenses of the invention may be designed for transmission from a point to a plane, from a plane to a point, from one surface to another, and, generally, for various adaptations.

In one modification the lenses of the invention are homogeneous and of uniform dielectric properties throughout. In this event the equalization of the phase delay is effected by selecting the geometrical thickness of the lenses and therefore the geometrical length of the propagation path in the lens medium. In another modification the lens may have any shape dictated by considerations of convenience—for example, it may be a parallel-sided flat slab—in which case the equalization of the phase delay is effected by properly selecting the quasi-optical thickness of the lens and therefore the quasi-optical path length. Proper selection of the optical path length, in turn, is accomplished by giving to the dielectric constant of the material various values at various locations. The word "thickness," as employed in this specification, refers to both cases.

The lenses of the invention may be designed by two methods. The first method, which is exact and analytical in nature, is principally applicable to situations in which the wave front on one side of the lens, for example, the incident wave, is truly spherical, as is the wave emitted by an ideal point source, and the wave on the other side is either a plane wave or a convergent spherical wave. The second method, which is approximate, is of broader application; i. e., to cases in which the wave fronts on the two sides of the lens are of arbitrary form. It proceeds by the selection of the lens thickness, geometrical or quasi-optical, to equalize the phase delay between an incident wave front and an emergent wave front, point for point.

When provided at its mouth with one of the novel lenses, and suitably energized as by a wave guide, an electromagnetic horn of conventional design constitutes a microwave antenna of improved performance capable of sending out a narrow beam of radiation whose wave fronts over a substantial fraction of its cross-section are substantially plane.

In practice the dimensions of microwave radiators, whether dipoles, horns, wave guide apertures or the like, are not vanishingly small, and their radiations are generally polarized in some one particular direction. As a consequence the radiation wave fronts are spheroidal, rather than truly spherical, the curvature in one plane, for example the "H" plane, being somewhat greater than the curvature in another plane, for example the "E" plane. For best results, therefore, the figure of the lens is axially asymmetrical to a small extent. That is to say its cross-sections in two mutually perpendicular planes differ slightly. This, however, makes for difficulty of manufacture, and good results may be had with a lens whose thickness, geometrical or quasi-optical, is everywhere an average, or other compromise, between the thickness as determined for E plane radiation and the thickness as determined for H plane radiation.

The invention is not restricted to symmetrical or to nearly symmetrical lenses. The principles of the invention are equally applicable to the design of lenses of other types, for example, a "cylindrical" lens, i. e., one having a thickness which varies in one direction but is uniform in a perpendicular direction. Such a lens, for example, may be employed in conjunction with a wedge-shaped horn to produce a fan-shaped beam of radiation.

The lenses may be individually figured, by machining or otherwise, to the requisite contours. Preferably, however, a mold is constructed to the required contours, whereupon large numbers of individual lenses may be fabricated by a molding process.

The invention will be fully apprehended from the following detailed description of preferred embodiments thereof taken in connection with the appended drawings in which:

Fig. 6 is a schematic diagram of a transmission system in which the lenses of Fig. 5 have been approached into coincidence with one another;

Fig. 7 is an outline view of a double convex lens, one face being spherical and the other face being figured and stepped in accordance with the invention;

Fig. 8 is a perspective view of a flat, wedge-shaped electromagnetic horn provided at its mouth with a cylindrical plano-convex stepped microwave lens;

Fig. 9 is a cross-section, taken in the "H" plane, of a plano-convex stepped lens;

Fig. 10 is a cross-section of the lens of Fig. 9 taken in the "E" plane;

Fig. 11 is an end view of the lens of Figs. 9 and 10;

Fig. 12 is a plot of phase measurements of the radiation of a microwave source, for use in designing a lens in accordance with one of the methods of the invention;

Fig. 13 is a diagrammatical cross-sectional view of a 90-degree conical electromagnetic horn provided at its mouth with a plano-convex stepped lens in accordance with the invention;

Fig. 14 is a diagrammatic cross-sectional view of a horn-lens combination similar to that of Fig. 13, the horn angle being 75 degrees;

Figure 1:
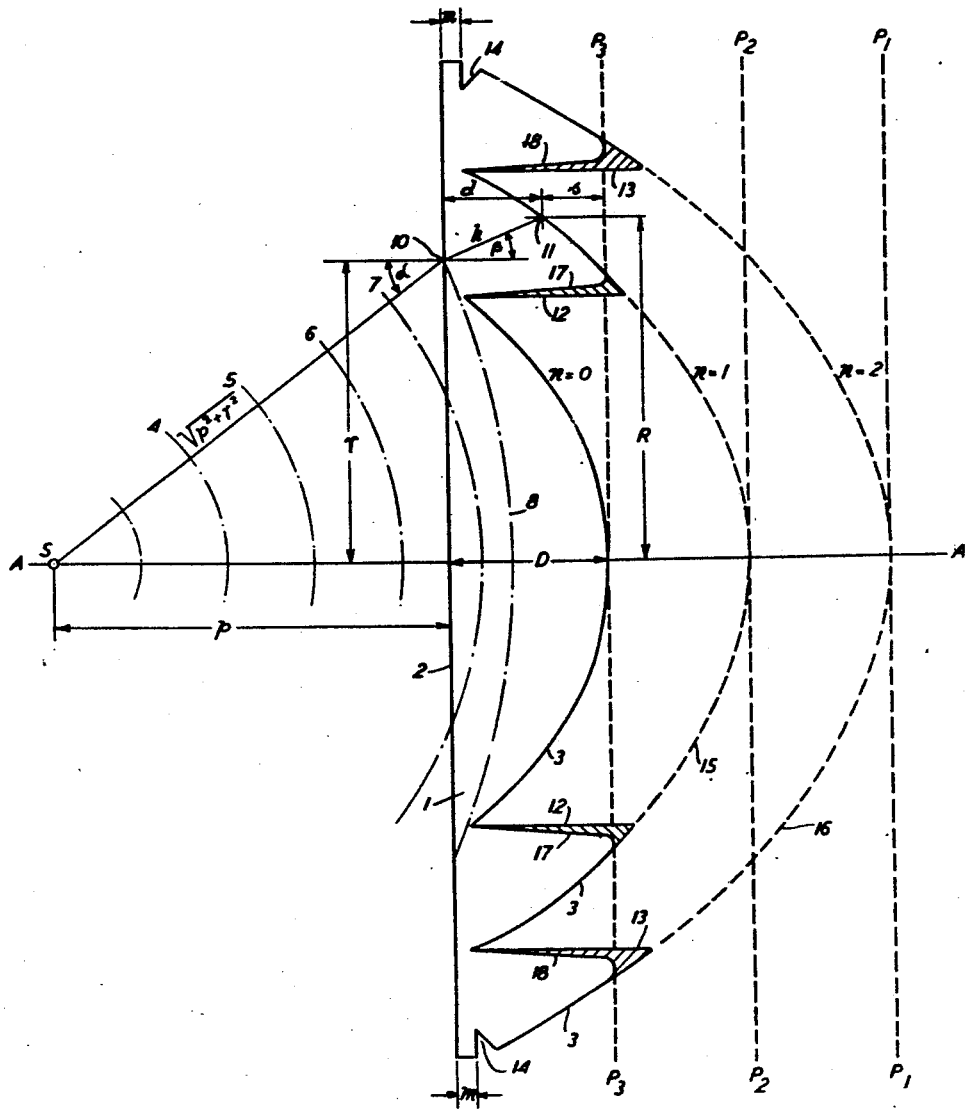
Fig. 1 is a diagrammatic view of a plano-convex lens constructed in accordance with the invention, and includes construction lines and symbols.

Referring now to the figures, Fig. 1 shows a plano-convex stepped dielectric microwave lens 1 having a flat face 2 and a stepped, contoured face 3. The contours are figured in accordance with the novel principles of the invention. The material of which the lens is made may be any material having a low absorption (high transparency) for radiation in the wavelength band of interest, and having a suitable index of refraction $\mu$ for waves in this range. Indices of refraction from 1.2 to 3 are convenient from the standpoint of design for lenses to be surrounded by air or vacuum, whose index of refraction is 1. When the surrounding medium is other than air, other values for the index of refraction of the lens material may be preferable. As is well known, the index of refraction $\mu$ of a non-absorptive medium is the square root of its dielectric constant $\epsilon$.

A point source S is located on the axis A—A of the lens, and distant $p$ from the flat face 2. The lens is so designed that spherical waves of microwave radiation originating at the source S and incident on the flat face of the lens are converted into emergent radiation of plane equiphase wave fronts. Successive incident wavelets are indicated at 4, 5, 6 and 7. An equiphase emergent plane wave front without discontinuities is indicated by the line $P_1-P_1$. A wave front which is plane and has one circular phase discontinuity of 360 degrees is indicated by the line $P_2-P_2$. A plane wave front having two circular discontinuities is indicated at $P_3-P_3$.

At a particular instant the trace on the plane face 2 of the lens 1 of a particular incident wave front is a circle of radius $r$. The cone joining this circle to the source may be thought of as a ray. Its length is evidently $$\sqrt{p^2+r^2} \qquad (1)$$

This ray travels through air from the source S to the plane surface of the lens which it meets at the point 10 and at an angle of incidence $\alpha$. It is refracted on entry into the dielectric medium, travels at an angle of refraction $\beta$ for a distance $h$ normal to the refracted wave front 8, and emerges from the convex face of the lens at the point 11. It is there again refracted on emergence from the dielectric medium into air and travels a distance $s$ before reaching the plane $P_3-P_3$. Because the plane $P_3-P_3$ is a wave front, the ray $s$ is perpendicular to it and therefore parallel with the lens axis A—A. The point 11, which is the trace of the emergent ray circle with the lens, lies at a radius R from the axis A—A. The angle which the surface of the lens at the point 11 makes with the normal to the plane $P_3-P_3$ must be such as to refract the ray $h$ along the direction $s$, and the design of the lens to be discussed below accomplishes this result.

To convert any one of the incident spherical waves 4, 5, 6, 7 to an emergent equiphase plane wave $P_1-P_1$ having no discontinuities, the condition to be imposed on the lens thickness at all points is that the phase delay from a sphere surrounding the source S to the plane $P_1-P_1$ shall be constant for all parts of the lens. To convert the incident waves into plane emergent waves over the plane $P_2-P_2$ having one circular phase discontinuity of 360 degrees, the condition is that the total phase delay shall have one constant value K for all portions of the wave that pass through the central portion of the lens and, over the portion of the lens beyond the first step, another constant value such that the phase discontinuity at the step is $2\pi$ radians. Since the phase angle $\theta$ is related to the frequency $f$ and the travel time $t$ by the equation $$\theta = 2\pi f t \qquad (2)$$

it follows that the travel time difference corresponding to a phase angle difference of $2\pi$ radians is $$\Delta t_1 = \frac{1}{f} \qquad (3)$$

where $f$ is the frequency of the radiation.

Similarly for conversion into emergent plane radiation over the plane $P_3-P_3$ having two circular discontinuities of $2\pi$ radians each, the travel time must be equal to a constant over the central portion of the lens, to the same constant plus $$\frac{1}{f}$$

over the first annular portion, and to the same constant plus $$\frac{2}{f}$$

over the second annular portion. Thus, in general, for emergent plane radiations having $n$ phase discontinuities of $2\pi$ radians each, the travel time must be equal to $$t = K + \frac{n}{f} \qquad (4)$$

Introducing these conditions into the geometrical problem of Fig. 1, there results $$\frac{\sqrt{p^2+r^2}}{c} + \frac{\mu h}{c} + \frac{s}{c} = K + \frac{n}{f} \qquad (5)$$

where $\mu$ is the "index of refraction" (the square root of the dielectric constant) of the material of the lens,
$c$ is the wave velocity in free space, and
$f$ is the frequency.

Similarly for the wave which travels along the axis of the lens $$\frac{p}{c} + D\frac{\mu}{c} = K \qquad (6)$$

where D is the thickness of the lens on its axis.

Now, for any wave, the frequency $f$, the velocity $c$ and the wavelength $\lambda$ are related by the equation $$c = f\lambda \qquad (7)$$

Combining Equations 5, 6 and 7, we obtain $$p + D\mu = \sqrt{p^2+r^2} + h\mu + s - n\lambda \qquad (8)$$

From the figure, $$d = h \cos \beta \qquad (9)$$

and $$s = D - h \cos \beta \qquad (10)$$

Introducing Equations 9 and 10 into 8 and solving for $h$, there is obtained $$h = \frac{n\lambda + D(\mu-1) + p - \sqrt{p^2+r^2}}{\mu - \cos \beta} \qquad (11)$$

Substituting (11) into (9) gives $$d = \frac{n\lambda + D(\mu-1) + p - \sqrt{p^2+r^2}}{\mu - \cos \beta} \cos \beta \qquad (12)$$

The bending of the ray at the flat surface of the lens is due to simple refraction so that $$\sin \beta = \frac{\sin \alpha}{\mu} \qquad (13)$$

and $$\cos \beta = \sqrt{1 - \frac{\sin^2 \alpha}{\mu^2}} \qquad (14)$$

From the figure $$\sin \alpha = \frac{r}{\sqrt{p^2+r^2}} \qquad (15)$$

so that (12) may be rewritten $$d = \frac{n\lambda + D(\mu-1) + p - \sqrt{p^2+r^2}}{\mu - \sqrt{1 - \frac{r^2}{\mu^2(p^2+r^2)}}} \sqrt{1 - \frac{r^2}{\mu^2(p^2+r^2)}} \qquad (16a)$$

or $$d = \frac{n\lambda + D(\mu-1) + p - \sqrt{p^2+r^2}}{\mu - H} H \qquad (16b)$$

where $$H = \sqrt{1 - \frac{r^2}{\mu^2(p^2+r^2)}} \qquad (16c)$$

From the figure, again, the radius of the circle of emergence is given by $$R = r + h \sin \beta \qquad (17)$$

and the thickness of the lens at the radius R is $$d = h \cos \beta \qquad (9)$$

Substituting (9) in (17) gives $$R = r + d \tan \beta \quad (18)$$

Again using (14) and (15) there results $$R = r\left(1 + \frac{d}{\sqrt{\mu^2(p^2+r^2)-r^2}}\right) \quad (19)$$

Equations 16a and 19 define the contour of the convex surface 3 of the lens. It will be observed that the surface defined is by no means spherical. The choice of the points at which the value of $n$ is increased by one unit is somewhat arbitrary and is determined by mechanical strength considerations. For example, the surface for the central zone ($n=0$) may be continued out to the point where the thickness of the material is at a minimum for mechanical strength and the surface of the material is then carried out to the next calculated surface (for which $n=1$) along the cylinder 12, $r$ being constant. This first annular zone may likewise be continued along the calculated surface to the circle of minimum thickness where the transition to the second annular zone may be similarly made along the cylinder 13. Finally, the surface is carried out to the periphery along the calculated surface for which $n=2$.

From Equation 16a particular values of the thickness for the various zones are as follows:

For $n=0$, i. e., the central zone $$d_0 = \frac{D(\mu-1)+p-\sqrt{p^2+r^2}}{\mu-H}H \quad (16d)$$

For $n=1$, i. e., the first annular zone (the contour is continued in the figure by the broken line 15):

$$d_1 = \frac{\lambda+D(\mu-1)+p-\sqrt{p^2+r^2}}{\mu-H}H \quad (16e)$$

For $n=2$, i. e., the second annular zone (the contour is continued in the figure by the broken line 16):

$$d_2 = \frac{2\lambda+D(\mu-1)+p-\sqrt{p^2+r^2}}{\mu-H}H \quad (16f)$$

Comparison of Equations 16d, 16e, and 16f for the contours of the several zones shows immediately that the distance separating the successive contours is, for any value of the radius $r$, given by the formula $$d_{n+1} - d_n = \frac{\lambda}{\mu-H} \quad (16g)$$

By referring to Equation 16c above, it will be seen that on the axis of the lens where the radius $r$ is zero, the quantity H reduces to unity so that the axial distance separating the successive zone contours is simply $$\frac{\lambda}{\mu-1} \quad (16h)$$

Off the axis, the Formula 16g is still exact, but the Formula 16h is a close approximation. The closeness of the approximation may be seen by solving Equation 16c to determine how far the exact value of H departs from unity in a particular case. Thus, taking a rather extreme case where the radius $r$ is one half the focal distance $p$ and where the index of refraction $\mu$ is $\sqrt{2}$, the Formula 16c reduces to $$\sqrt{1-\frac{1}{10}}$$

or 0.95, while for higher values of the index of refraction, longer focal distances, or smaller values of the radius, H is still closer to unity.

The value of D, the maximum thickness, on the axis of the lens, is obtained from the formula $$D = \frac{\lambda}{\mu-1} + m \quad (20)$$

wherein the first term represents a thickness which produces a phase delay of $2\pi$ radians or 360 degrees as compared with a travel in free space over the same distance, and the second term, as indicated in Fig. 1, is the minimum thickness required for mechanical strength. Apart from considerations of strength and facility of mounting, $m$ may be made equal to 0, which allows of a lesser overall thickness of the lens and a thickness at the center which introduces a phase delay of 360 degrees.

The lens figured in accordance with Equations 16a and 19 substantially eliminates spherical aberration. For radiation of a single wavelength, chromatic aberration offers no problem so that the lens is substantially perfect.

Reduction of the number of steps in the lens to a small value, while it increases the bulk, weight and cost of the lens, tends to reduce chromatic aberration and therefore to permit the use of the lens over a frequency band. When there are no steps at all, in the absence of dispersive characteristics of the material, the unstepped lens, having a contour, for example, defined by Equation 16d and indicated by the broken line 16, is free of chromatic aberration as well as spherical aberration. Similarly, the two-zone lens, contour 15, is freer from chromatic aberration than the three-zone lens, contour 3.

In the actual fabrication of the lens, it is advisable to round off the sharp outer edges of the annular zones and also to introduce a slight outward taper on the inner cylindrical portions, 12, 13. This reduces the adverse effects of refraction and diffraction due to the passage of a ray between any zone and the next outer zone at a grazing angle to the cylindrical surface 12 or 13. Removal of this material indicated in the figure by cross-hatching is harmless because, as can be seen from the figure, any ray which enters one of the annular zones travels through it at a divergent angle. The resulting contours are indicated at 17 and 18.

The material of which the lenses are made may be of any sort which exhibits low absorption or high transparency in the wavelength band of interest, and a dielectric constant or refractive index of an appropriate magnitude. Thus, polystyrene or any similar material is suitable. A three zone lens of 13½ inches in diameter having a maximum central thickness of 2 7/16 inches, constructed of material whose refractive index is 1.5–1.6, has given excellent performance with a microwave source of 3.2 centimeters wavelength, placed at a distance of 6 inches from the flat face 2.

Figure 2:
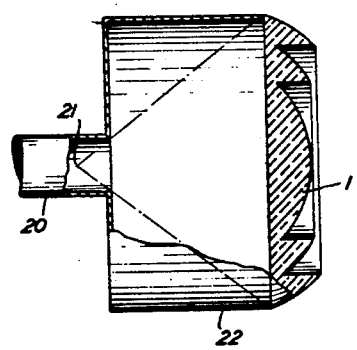
Fig. 2 is a cross-sectional view of the lens of Fig. 1 conjoined with a wave guide radiator by way of a shielding skirt.

Fig. 2 shows a stepped equiphase lens, which may be similar to that of Fig. 1, arranged to receive and direct the radiations emerging from the open end of an electromagnetic wave guide 20. It is known that such a wave guide radiates energy which, over a cone of limited extent, is approximately spherical, the center of the sphere being at a point 21 inside of the mouth of the guide. Therefore the lens 1 may be designed to work from a point source S as in Fig. 1 and may be effectively associated with the wave guide 20 in the manner shown. A shield 22 may be employed for mounting the lens 1 on the wave guide 20 and to assist in preventing the loss of radiation in undesired directions. The physical attachment of the lens to the shield 22 may be effected in any convenient manner, for example, by spinning the forward edge of the shield into a circular groove 14 (Fig. 1) cut in the lens at its periphery.

Figure 3:
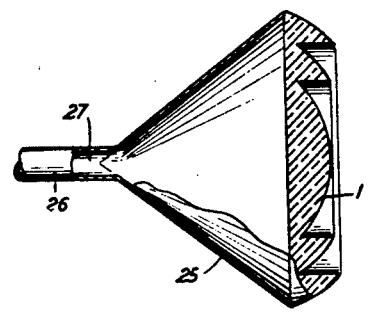
Fig. 3 is a cross-sectional view of the lens of Fig. 1 fixed to the mouth of an electromagnetic horn.

Fig. 3 shows a lens 1, which again may be similar to that of Fig. 1, mounted at the mouth of a conical electromagnetic horn 25 of known variety which may be fed with energy from a wave guide 26. Such a horn behaves as a source of approximately spherical radiations, the position of the virtual source being in the general neighborhood of the apex 27 of the cone. Thus, again, the lens may be designed for operation from a point source and may be effectively combined with the electromagnetic horn to provide a radiating or receiving structure of a high degree of directivity and efficiency.

Figure 4:
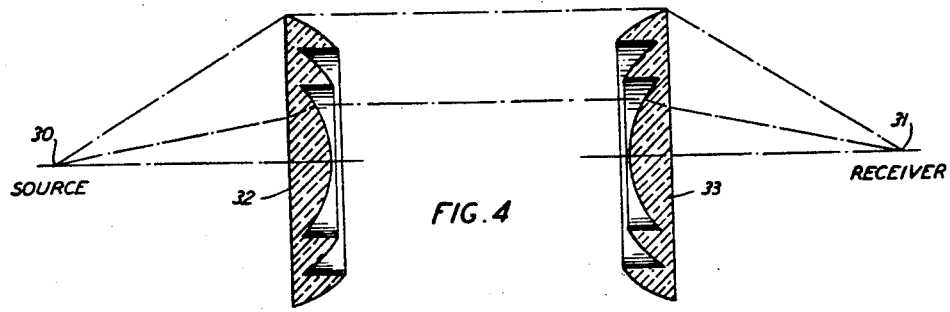
Fig. 4 is a schematic diagram of a microwave transmission system including two spaced plano-convex lenses with their convex faces facing each other.

Fig. 4 shows a microwave transmission system comprising a source 30, a receiver 31 and two stepped equiphase lenses 32, 33, between. The left-hand or transmitting lens 32 may be identical with the one shown with Fig. 1 and described in detail above, and it operates in similar manner. The right-hand or receiver lens 33 may be identical with that of Fig. 1 and, by reason of the reciprocity principle, it operates equally well when the direction of the incident radiation is reversed. In other words the lens of Fig. 1 operates equally well as a transmitter or as a receiver. Because of the high degree of efficiency and directivity of the transmitter lens 32, the two lenses of Fig. 4 may be widely separated.

Figure 5:
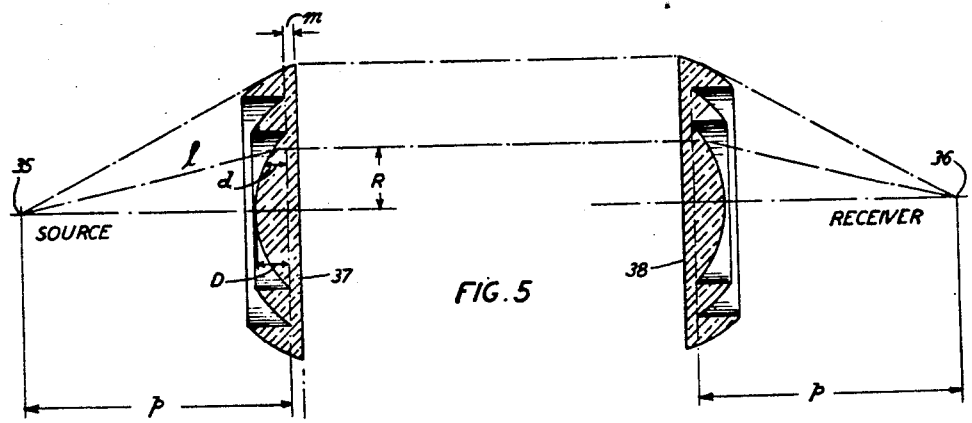
Fig. 5 is a schematic diagram of a microwave transmission system similar to that of Fig. 4 but including a pair of plano-convex lenses of modified design with their plane faces facing each other.

Fig. 5 shows a transmission system similar to that of Fig. 4 but comprising two lenses 37, 38 of a somewhat modified form, the convex stepped faces facing the source 35 and the receiver 36, respectively. The modification of form, which is of fairly small magnitude, comes about by reason of the fact that, in the lenses of Fig. 5, the rays within the lens material are always parallel to the axis, instead of divergent as in the case of Fig. 1. This difference results in a difference of the design formulae and therefore of the contours of the convex faces.

The design of a lens in accordance with Fig. 5 will be understood from the following brief description.

As before, there is to be imparted to the wave along the axis a phase delay of 360 degrees. This fixes the central thickness as $$D = \frac{\lambda}{\mu - 1}$$

i. e., the thickness given by Equation 20 above, without allowing for any additional thickness $m$ for strength. Now for a wave off the axis, the distance R from the source 35 to the convex surface of the lens 37 will be greater than the distance along the axis from the source to the lens, and the required phase delay is therefore to be reduced by an amount $$\theta = 2\pi \frac{l - (p - d)}{\lambda} \qquad (21)$$

where $d$ is the thickness at the radius R and $p$ is the distance from the flat face to the source. The thickness $d$ is therefore $$d = \frac{\lambda}{\mu - 1}\left(n - \frac{\theta}{2\pi}\right) \qquad (22)$$

Where $n$, the zone number, may have the values 1, 2, 3, etc. but never 0.

Rearranging terms gives $$d = \frac{n\lambda}{\mu - 1} - \frac{l + d - p}{\mu - 1} \qquad (23)$$

or $$l = n\lambda - d(\mu - 1) - d + p = n\lambda - d\mu + p \qquad (24)$$

But, from the figure $$l = \sqrt{R^2 + (p - d)^2} \qquad (25)$$

so that $$R^2 = (n\lambda - d\mu + p)^2 - (p - d)^2 \qquad (26)$$

or $$R = \sqrt{(n\lambda - d\mu + p)^2 - (p - d)^2} \qquad (27)$$

Because the rays travel through the lens parallel with the axis, the radius of emergence is equal to the radius at incidence so that only one equation is required to define the lens contour. This relation is provided by Equation 27 which furnishes an exact relation between the thickness $d$ of the lens at any point and the radius R at which this thickness obtains. There may now be added a layer of thickness $m$, for strength.

Because of the reciprocity principle this lens operates equally well as a receiver and such a lens 38 is shown at the right-hand portion of Fig. 5 in position to receive the equiphase plane radiations transmitted by the left-hand lens 37 and converge them onto a receiver 36. Furthermore, as in the case of Fig. 4, the lenses of Fig. 5 may be widely separated. However, the flat rear faces of these lenses lend themselves to placement in mutual contact, thus providing a symmetrical compound double convex stepped equiphase lens 40 as shown in Fig. 6. Each step of either half of the lens of Fig. 6 introduces discontinuities of $2\pi$ radians in the phase of the radiation, and therefore each step of the lens, taken as a whole introduces discontinuities of $4\pi$ radians. If desired, the lens of Fig. 6 may be redesigned as a whole to operate between the source S and the receiver R and allowing the zone number $n$ to increase in steps of unit magnitude for both sides of the lens taken together. This gives contours of slightly different form. The defining equation is $$R = \sqrt{\left(\frac{n\lambda}{2} - d\mu + p\right)^2 - (p - d)^2} \qquad (28)$$

Where $d$ is the thickness of each half of the lens 40, measured from the figured face to the strengthening layer whose full thickness is $2m$, and the other symbols have the same meanings as before. From the derivation of the design formulae applicable to Fig. 1 and Fig. 4, the derivation of Equation 28 will be sufficiently obvious to those skilled in the art.

By following the principles outlined above and equalizing the phase delays from a point on one side of the lens to a plane on the other, and allowing for phase discontinuities of $2\pi$ radians at each zone transition, the invention may also be applied to a lenticular body 41 of the form shown in Fig. 7 in which the outer face is not a plane but some other surface, for example, a sphere. Such a structure offers less resistance to high winds and is therefore useful for mounting on a high speed vehicle, for example, an airplane.

Fig. 8 shows the adaptation of the principles of the invention to a cylindrical lens 42, i. e., one in which the thickness varies in one direction only, being uniform in the other. Such a lens is useful in combination with a flat electromagnetic horn 43 energized, for example, by a flat wave guide 44. This lens may be designed following the procedure explained in connection with Fig. 1 for a virtual source at the apex 45 of the wedge-shaped horn. The combination produces a fan-shaped beam of radiations of substantially the width of the long dimension of the horn mouth in one direction and diverging in a perpendicular direction.

Certain types of radiators of microwaves emit waves whose wave fronts are spheroidal as distinguished from spherical, the radius of curvature in one plane normal to the direction of propagation, for example, the "E" plane, being different from the radius of curvature in another plane, for example, the "H" plane. The radiation from the open end of a wave guide operated in the dominant mode is of this character. In some cases the radiation from a dipole is likewise of this character. For ideal cooperation with a radiator of this type, the stepped dielectric lens is not of axial symmetry. Rather it exhibits contours which are different in two mutually perpendicular planes. Each of these countours can be separately computed from Equations 16 and 19 using different values of $p$, the distance of the lens to the virtual position of the source. There will result two different contours as illustrated for example in Figs. 9 and 10, the annular groove separating the adjacent zones being deeper along one diameter than along the other. Fig. 11 shows the appearance of this lens from the axis. If preferred, the minimum thickness may be held constant, in which case the outline of each zone, as viewed along the axis, will be an ellipse.

However, because of the difficulty of fabricating such a lens, it is usually preferable to construct an axially symmetrical lens, using for the source distance $p$ a length intermediate between the radii of curvature of the uncorrected waves in the H and E planes.

When it is desired to convert an advancing wave front of arbitrary form into another wave front of arbitrary form, which latter wave front will in the usual case be either a plane equiphase wave front or a converging spherical wave front, the approach described above in connection with Figs. 1, 4 and 5 cannot be employed because it is impossible to locate any axial point from which the non-spherical waves emerge. Under these conditions, however, it is possible to employ an approximate method which is of more general application than the exact method described above. The principle is the same, namely, to equalize the phase delay between the incident wave front and the emergent wave front. The method is approximate because it is impossible without excessive complexity to take into account the refraction which takes place at each surface of the lens.

Thus, suppose the phase angle of the oncoming microwave radiation be measured, with respect to an arbitrary datum, throughout a plane normal to the direction of radiation. A group of these observations, taken along one diameter, may then be plotted in the form of a curve 46, Fig. 12, in $r-\theta$ coordinates. Evidently the phase delay required to convert the radiation in question into an equiphase plane wave front is given for all points by the distance between the ordinate of Fig. 12 and the curve. For example, at a distance $r_1$ from the axis it is given by the length $\theta_1$.

If, as in Fig. 12, the required phase delay greatly exceeds 360 degrees and it is considered that a stepped lens will be satisfactory, steps of 360 degrees axial depth may be introduced in the curve 46 of Fig. 12, thus producing in succession, the curves 47 and 48.

From the relation $$D = \frac{\lambda}{\mu-1} + m \qquad (20)$$

which gives the thickness necessary to produce a phase delay of 360 degrees or $2\pi$ radians with an additional portion for mechanical strength, it is evident that the lens thickness required to produce a phase delay $\theta$ is given by $$d = \frac{\theta}{2\pi} \frac{\lambda}{\mu-1} + m \qquad (29a)$$

Now Equation 29 states that the relation between the lens thickness $d$ and the phase delay $\theta$ is a linear one, disregarding the excess thickness $m$ required for mechanical strength. Therefore, the contour of the required lens is similar to the curve 46, 47, or 48 of Fig. 12 and, indeed, is identical except for the scale factor $$\frac{\lambda}{2\pi(\mu-1)} \text{ centimeters per radian} \qquad (30)$$

It is then only necessary to replot the curve of Fig. 12 to the new scale and the resulting curve immediately gives the contour of the required lens. For example, for a refractive index of 2 and a wavelength of 2.54 centimeters, the scale factor is $$\frac{2.54}{2\pi} \text{ centimeters per radian}$$

so that the lens contour is given immediately and to scale by the curve of Fig. 12. The contour curve can now be used to construct a template from which the lens itself, or, if a molding operation is contemplated, the lens mold may be cut or machined. In the finished lens, a small amount of material of thickness $m$ is left everywhere for mechanical strength.

Thus, from Equation 29a, the thickness for a phase delay $\theta$ of $2\pi$ radians is $$d_0 = \frac{\lambda}{\mu-1} + m \qquad (29b)$$

while for a phase delay of $4\pi$ radians, it is $$d_1 = \frac{2\lambda}{\mu-1} + m \qquad (29c)$$

and for a phase delay of $6\pi$ radians, it is $$d_2 = \frac{3\lambda}{\mu-1} + m \qquad (29d)$$

and so on. Evidently, the difference, or step depth, which is the distance separating the extension of the surface of each zone from the immediately preceding zone, is equal to $$\frac{\lambda}{\mu-1} \qquad (29e)$$

In other words, the step depth, as computed by this approximate method, is the same as the approximate value of the step depth as computed by the exact method and given by Equation 16g.

Fig. 13 is a cross-sectional view to scale, of a micro-wave radiating or receiving unit comprising an electromagnetic horn and a stepped plano-convex equiphase lens. The horn 50 is a 90-degree circular cone of conductive material such as copper, and of 16 inches mouth diameter. It was energized from a circular wave guide 51 of one inch diameter, the guided waves being in the dominant mode. The lens 52 was constructed of polystyrene with a refractive index of 1.5 for use at a wavelength of 3.2 centimeters. The lens was designed by the approximate method last described above. That is to say, the phase of the radiation emerging from the horn in the absence of the lens was recorded and plotted across the diameter of the horn mouth to give a phase curve like that of Fig. 12; steps were introduced into the phase curve at intervals of 360 degrees, and the conversion factor (30) was computed for a wavelength of 3.2 centimeters and a dielectric constant of 2.5, i. e., a refractive index of 1.58. Thus $$\frac{1}{2\pi}\frac{\lambda}{\mu-1}=\frac{1}{2\pi}\frac{3.2}{0.58}=0.88 \text{ cm. per radian} \quad (31)$$

or 2.17 inches at the thickest part. The curve was replotted to the new scale, and to this was added ¼ inch for strength at the thin portions. A templet was cut to coincide with the curve, and the lens was machined from the templet.

In the phase measurements across the mouth of the horn it was found that the phases of the radiation as measured in the "E" plane differed somewhat from the phases of the radiation as measured in the "H" plane. The lens was cut to the average of these two sets of measurements. It gave excellent results. Although the phase difference between the radiation at one part of the horn mouth and other parts of the horn mouth diameter without the lens differed by as much as 1080 degrees, the emergent wave front with the lens differed nowhere by as much as 180 degrees. The differences were positive in the "H" plane and negative in the "E" plane. This horn-lens combination radiates a highly directive, narrow beam, with insignificant minor lobes spaced at angles of 15 to 30 degrees from the axis of the major lobe and 40 to 50 decibels below the major lobe in strength.

Fig. 14 shows another microwave radiating or receiving unit comprising a horn-lens combination. In this case the horn 55 was a circular cone of 75 degrees angle and of 16 inches mouth diameter similarly fed from a one-inch wave guide 56 operating in the dominant mode. As in Fig. 13, the lens 57 was of polystyrene of dielectric constant 2.5, and the wavelength was 3.2 centimeters. Design was carried out in the same manner as the design of the unit of Fig. 13. The combination radiated a very narrow highly directive beam whose wave front differed in phase nowhere by more than 90 degrees—and this despite the fact that the phase differences measured across the diameter of the horn mouth without the lens were as much as 700 degrees. As before, the measured phase curve in the "E" plane differed slightly from the measured phase curve in the "H" plane and a compromise or average phase curve was used as the basis of the lens contour. The phase front of the emergent radiation of the combination departed slightly from an equiphase front in the positive direction in the "H" plane and in the negative direction in the "E" plane. The radiation of the combination exhibited insignificant minor lobes at angles of 15 to 30 degrees from the major lobe axis and 40 to 50 decibels down in strength from the major lobe.

In the lenses described above, the uniform refractive index and the graded geometrical thickness combine to introduce the required phase delay at all points of the lens. This combination, however, is not the only one which is capable of such operation. Another is the combination of a uniform thickness with a refractive index which is graded over the lens diameter, or in the case of a cylindrical lens, over its length.

Figure 15:
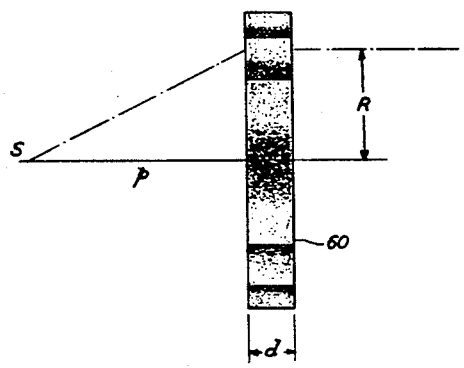
Fig. 15 is a diagrammatic cross-sectional view of a parallel sided slab lens in which the dielectric constant is graded throughout each zone.
Figure 16:
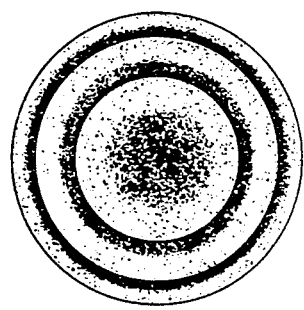
Fig. 16 is an end view of the lens of Fig. 15.

Fig. 15 shows a cross-section and Fig. 16 shows an end view of a graded dielectric lens 60 whose faces are geometrically parallel. It is known that by the admixture of two or more different ingredients, one having a low dielectric constant and another a high dielectric constant, a compound material may be obtained whose effective dielectric constant has any desired value intermediate the dielectric constant values of the two ingredients. The lens of Figs. 15 and 16 may be fabricated, therefore, by mixing the different materials in a mold in proportions which are graded along a diameter of the mold. The proportions at each different radius are to be such that the refractive index, i. e., the square root of the effective dielectric constant, has the proper value, with a lens of given thickness, to interpose the required phase delay. The required phase delay may be obtained from phase measurements of the source without the lens as described in connection with Fig. 12, or it may be visualized as an "equivalent optical thickness" and computed in the manner outlined in connection with Fig. 1. The grading may be continuous or stepped, as desired. The grading of the lens of Figs. 15 and 16 is stepped twice, thus producing a lens having a central zone and two annular zones.

Various materials may be employed for lenses of this type. For the low dielectric constant component polyethylene, polystyrene, polytetrafluoride and various polyvinyl polymers are suggested. For the components of high dielectric constant lead chloride, titanium dioxide (the rutile form) and other titanates are suggested.

For a lens of this character having geometrically flat parallel sides, as in Fig. 14, the formula which relates the local value of the refractive index $\mu$ to the radius R at which it obtains is $$\mu = M - \frac{\sqrt{p^2+R^2}-n\lambda-p}{d} \quad (32)$$

where

M is the refractive index at the center
p is the distance of the lens from the source,
$\lambda$ is the wavelength,
d is the geometrical thickness,
n is the zone number (=0, 1, 2, etc.).

Figure 17:
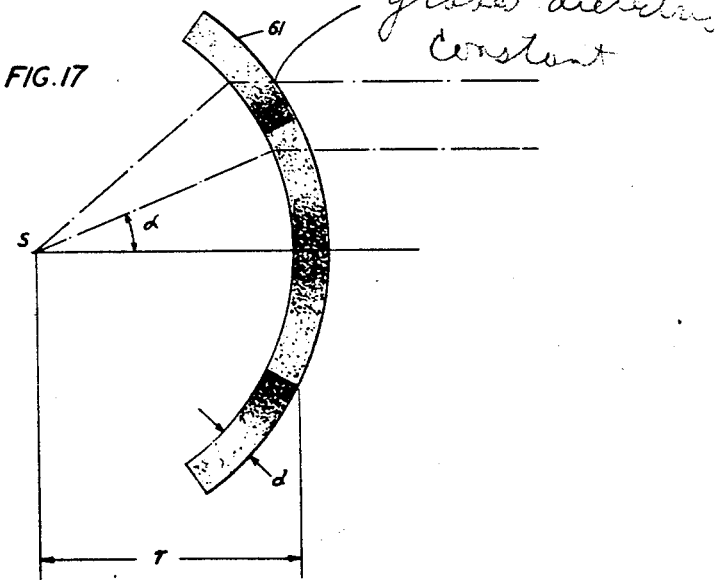
Fig. 17 is a diagrammatic cross-sectional view of a spherical shell lens of uniform geometrical thickness, in which the dielectric constant is graded.

The same principles may be applied to lenses of other geometrical shapes, for example, to a spherical shell 61 of uniform thickness d as shown in Fig. 17, the source being placed at the center of curvature and at a distance r from the inner surface. In this case the formula is $$\mu = M - \frac{r(1-\cos\alpha)-n\lambda}{d}$$

where

M is the refractive index on the axis,
r is the center of curvature and the location of the source,
$\alpha$ is the angular distance from the axis,
$\lambda$ is the wavelength, and
n is the zone number (=0, 1, 2, 3, etc.).

In addition to the shapes, geometrical or quasi-optical, described above, still others are possible when the principles of the invention are followed. The contours may be on either surface, or they may be distributed equally or unequally between both surfaces. They may be imposed on a body whose surfaces before figuring are flat, as in Figs. 1 and 15, spherical as in Figs. 7 and 17 or otherwise, as desired. Still another combination results when both the refractive index and the geometrical thickness are graded in such a way that their product gives the required phase delay.

For the details of the relations which hold between the dielectric constant of the components of the mixture, their proportions and the effective dielectric constant of the resulting material, reference may be made to an article by L. J. Berberich and M. E. Bell entitled "The Dielectric Properties of the Rutile Form of TiO₂" published in the Journal of Applied Physics, volume 11, page 681, October 1940.

What is claimed is:

1. A dielectric lens for focusing or refracting waves having a given wavelength, said lens having at least one focal point and a face comprising a plurality of successively concentric zones, said face having a contour such that over any diametral cross section thereof, an extension of the surface defined by each successive zone from the innermost zone to the outermost zone is spaced from the surface of the immediately preceding zone by a distance in the direction of propagation given by the formula $$\frac{\lambda}{\mu - 1}$$

where $\lambda$ is the free space wavelength at the operating frequency and $\mu$ is the refractive index of the lens material.

2. A dielectric lens as defined in claim 1 which is axially symmetric.

3. A microwave lens comprising a body of dielectric material having a substantially spherical exterior surface for reducing wind resistance and, on the interior surface, a face having a plurality of successively concentric zones and a contour as defined in claim 1.

4. A dielectric lens having two like oppositely located faces each of which has a contour as defined in claim 1.

5. A dielectric lens as defined in claim 1 having a surface whose contours are different along two mutually perpendicular directions, the contour in one direction being adapted to convert incident spherical radiation originating in a source located at a first axial point into equiphase plane emergent radiation, the contour in the other direction being similarly adapted to convert incident spherical radiation originating in a source located at a different axial point into equiphase plane emergent radiation.

6. A microwave antenna which comprises a microwave source adapted to radiate spheroidal waves having a first radius of curvature in the "E" plane and a second radius of curvature in the "H" plane, and a dielectric lens as defined in claim 5, the source being disposed on the axis of the lens and at a distance therefrom such that said spheroidal waves are converted by said lens into equiphase plane emergent waves.

7. A microwave antenna which comprises a microwave source adapted to radiate spheroidal waves having a first radius of curvature in the "E" plane and a second radius of curvature in the "H" plane, and a dielectric lens as defined in claim 5 disposed with said source on the lens axis and having a surface whose contour in the "E" plane is aplanatic for a point source spaced from said lens by a distance equal to said first radius and whose contour in the "H" plane is aplanatic for a point source spaced from said lens by a distance equal to said second radius.

8. A plano-convex dielectric lens of which the contour of the convex face is defined by the equation $$d = \frac{n\lambda + D(\mu - 1) + p - \sqrt{p^2 + r^2}}{\mu - \sqrt{1 - \frac{r^2}{\mu^2(p^2 + r^2)}}} \sqrt{1 - \frac{r^2}{\mu^2(p^2 + r^2)}}$$

and the equation $$R = r\left(1 + \frac{d}{\sqrt{\mu^2(p^2 + r^2) - r^2}}\right)$$

where $n$ has the value of zero or any integer, $\lambda$ is the wavelength, $\mu$ is the refractive index, $p$ is the lens focal length, $D$ is the axial lens thickness, $r$ is the radius of the circle of incidence of a ray, $R$ is the radius of the circle of emergence of said ray and $d$ is the lens thickness at the circle of emergence.

9. A plano-convex dielectric lens in which the contour of the convex face is divided by integral wavelength phase delay steps into zones, and in which the contour of each zone is defined by the equation $$d = \frac{n\lambda + D(\mu - 1) + p - \sqrt{p^2 + r^2}}{\mu - \sqrt{1 - \frac{r^2}{\mu^2(p^2 + r^2)}}} \sqrt{1 - \frac{r^2}{\mu^2(p^2 + r^2)}}$$

and the equation $$R = r\left(1 + \frac{d}{\sqrt{\mu^2(p^2 + r^2) - r^2}}\right)$$

where $n$ has the value of zero or any integer, $\lambda$ is the wavelength, $\mu$ is the refractive index, $p$ is the lens focal length, $D$ is the axial lens thickness, $r$ is the radius of the circle of incidence of a ray, $R$ is the radius of the circle of emergence of said ray and $d$ is the lens thickness at the circle of emergence.

10. A plano-convex dielectric lens in which the contour of the convex face is defined by the following equation $$R = \sqrt{(n\lambda - d\mu + p)^2 - (p - d)^2}$$

where $n$ has the value of zero or any integer, $\lambda$ is the wavelength, $\mu$ is the refractive index, $p$ is the lens focal length, $R$ is the radius of emergence and $d$ is the lens thickness at the circle of emergence.

ALBERT M. SKELLETT.

REFERENCES CITED

The following references are of record in the file of this patent:

UNITED STATES PATENTS

| Number | Name | Date |
|---|---|---|
| 1,906,546 | Darbord | May 2, 1923 |
| 2,206,923 | Southworth | July 9, 1940 |
| 2,273,447 | Ohl | Feb. 17, 1942 |
| 2,283,935 | King | May 26, 1942 |
| 2,405,992 | Bruce | Aug. 20, 1946 |
| 2,415,352 | Iams | Feb. 4, 1947 |
| 2,422,579 | McClellan | June 17, 1947 |
| 2,429,601 | Biskeborn et al. | Oct. 28, 1947 |

OTHER REFERENCES

"Metal-Lens Antennas," by Winston E. Kock, Proc. IRE, November 1945.